United States Patent Office 2,971,444
Patented Feb. 14, 1961

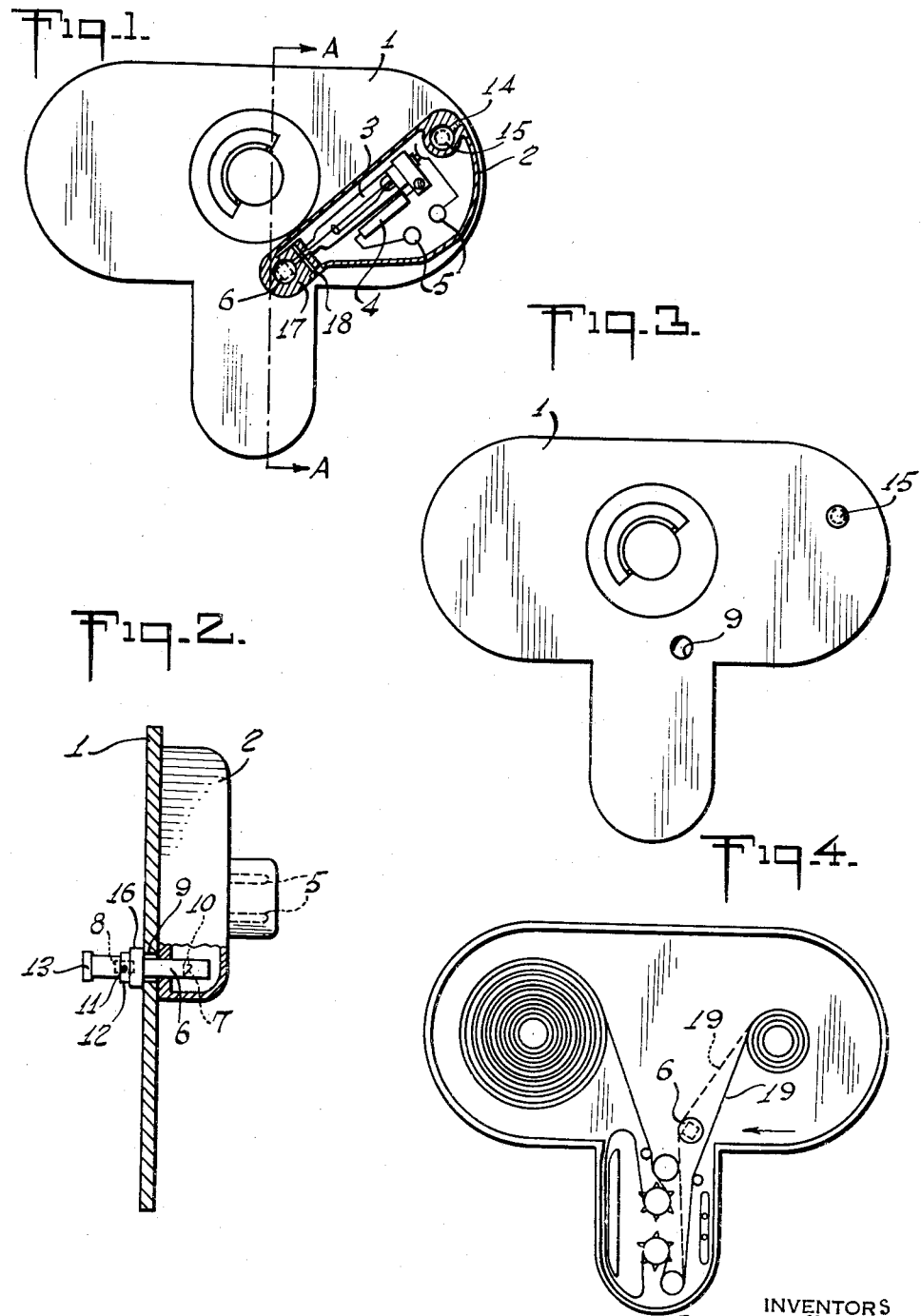

2,971,444

FILM MARKING DEVICE

Rudolf Grötzschel and Heinz Hofmann, Dresden, Germany, assignors to VEB Kamera- und Kinowerke Dresden, Dresden, Germany Filed June 12, 1957, Ser. No. 665,253

Claims priority, application Germany June 21, 1956

2 Claims. (Cl. 95—1.1)

This invention relates to mechanisms employing moving film, and more particularly to devices for marking film for enabling different portions thereof to be identified or for various other purposes.

Film marking devices, such as time indicators or footage indicators, have been developed as structural units to be attached to cameras. If, however, a camera is not originally adapted to accommodate such units, subsequent modification of the camera presents a great inconvenience.

It is an object of the invention to provide for film marking independent of camera construction so that whether or not a camera is adapted to accommodate known marking devices is of no consequence.

Briefly, the invention achieces its principal objective by providing for the mounting of a film marking device on the film magazine and by further providing for coupling the film marking means through the cover of the magazine to a region whereat it can be utilized in connection with the film.

As will be shown, the modification required of known magazines, if the same are not originally provided for use in accordance with the invention, are so simple as to be very economical as regards both materials and labor.

Other objects and advantages of the invention will be understood from the following detailed description of a preferred embodiment of the invention, the description including the attached drawing wherein:

Figure 1 is a top view of a magazine cover with a marking device mounted thereupon in accordance with the invention;

Figure 2 is a sectional view taken along line A—A in Fig. 1;

Figure 3 illustrates a magazine cover adapted to receive the marking device; and Figure 4 illustrates the inside of a magazine and shows, particularly, the film path with and without the marking device in dotted and solid lines, respectively.

The magazine shown in the drawing includes a detachable cover 1 in conventional manner which, however, supports a housing 2 enclosing a glow discharge lamp 3 and a resistor 4 and supporting male plug connections 5. The resistor 4, which is a load resistor, and the glow discharge lamp 3 are connected in electrical series intermediate the connections 5 which in turn are adapted to be connected to a source of electrical power.

A tubular support or body 6 supporting in its interior two deflection prisms 7 and 8 extends through an opening 9 in the cover 1 and constitutes a coupling means between the inside chamber defined by the magazine and the exterior of the magazine whereat the marking device is mounted.

As will have been understood from the foregoing description, the marking device includes a source of light which is, in fact, the glow discharge lamp 3. Light radiated by this lamp passes through a radial aperture 10 in the tubular support 6 and reaches the prism 7 whereat the light beam is deflected ninety degrees and travels axially along the interior of the tubular support 6. When the beam of light reaches the prism 8, it is once again deflected by an angle of ninety degrees so that it passes radially outwards from the support 6 through a radial aperture 11.

Light passing out of the aperture 11 strikes the film 19 (see Fig. 4) which slides over two guide surfaces 12 and 13 provided at that extreme of the support 6 which is inside of the magazine chamber.

The housing 2 is secured to the cover 1 by means of a screw 14 and a pin 15 which is riveted or welded to the cover in a manner as to extend externally from the magazine. The housing 2 is further secured, at its other end, by means of the tubular body 6. Fig. 3 shows the simple modification required of known magazine covers for adaptation to use in accordance with the invention.

To perform its securing function and for its own support, the support 6 is provided with a flange or collar 16 which is intended to abut against the inside of the cover 1. Externally of the magazine or film chamber, the support 6 is received by an open bearing 17 which is slotted to enable adjustment by means of a screw 18.

Figure 4 illustrates the open magazine with the film 19 following its normal path (solid line), the path of the film in accordance with the invention being shown in dotted line. In order to obtain this latter path, the cover 1 is first displaced laterally and then moved into its final position in the direction of the arrow.

The aperture 9 in the cover 1 may readily be sealed by a light proof plug of a type known per se thus making it possible to use the magazine without the marking device.

In operation, light from the lamp 3 is directed prismatically towards the film 19 which can be exposed thereto in various known manners. The lamp 3 can be maintained in a radiating condition for a determinable period of time so as to mark off or identify a certain portion of the film corresponding to a particular exposure or the lamp 3 can be cyclically flashed so as to place a footage marking on the film. The uses are exemplary only and are not to be considered as limitative of the invention.

Moreover, although the tubular support can be fixedly mounted with regard to the cover 1, it can be as well mounted for rotation so as, for example, to be rotated by the engagement of the film 19 whereby the film will be periodically marked.

In fact, there will now be obvious to those skilled in the art many modifications of the structure set forth which do not depart essentially from the spirit of the invention as defined in the following claims.

What is claimed is:

1. A film magazine comprising a housing, a door on said housing, a film marking device including a casing secured to the door of said housing, a light within said casing, means to actuate said light electrically, a hollow shaft extending from said casing into the interior of said magazine in the path of the film located in a position to cause said film to engage and bend around said shaft when in an operative position, means on said shaft for directing light from said lamp through said shaft and into the interior of said magazine, and means on said shaft to direct light onto the portion of the film which engages said shaft.

2. In a film magazine for insertion into a camera so as to expose the film in the magazine to the light from an objective lens in said camera, wherein a casing is secured to the outside of said magazine for the purpose of enclosing apparatus which intermittently marks film in said magazine as said film passes from one spool to another, and wherein a light is provided in the casing and connected for electrical operation, the improvement which comprises said casing being secured to the door of said magazine, a hollow shaft extending from the interior of said casing to the interior of said magazine into the path of said film, means in said shaft for directing rays from said light through said shaft and into the interior of said magazine, a pair of surfaces projecting from said shaft for engaging the edge surfaces of the film within the magazine as said film passes from one spool to another and located in a position to cause bending of said film around said edges, and means in said shaft inside said magazine for directing light coming into said magazine to the portion of said film which is engaged by one of said surfaces.

References Cited in the file of this patent

UNITED STATES PATENTS

| | | |
|---|---|---|
| 1,810,002 | Arnold | June 16, 1931 |
| 2,273,876 | Lutz | Feb. 24, 1942 |